United States Patent
Ikawa

(10) Patent No.: US 11,314,839 B2
(45) Date of Patent: *Apr. 26, 2022

(54) APPARATUS FOR WEBPAGE SCORING

(71) Applicant: INTERNATIONAL BUSINESS MACHINES CORPORATION, Armonk, NY (US)

(72) Inventor: Yohei Ikawa, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/778,224

(22) Filed: Jan. 31, 2020

(65) Prior Publication Data
US 2020/0167398 A1 May 28, 2020

Related U.S. Application Data

(63) Continuation of application No. 15/793,244, filed on Oct. 25, 2017, now Pat. No. 10,606,914.

(51) Int. Cl.
- *G06F 16/958* (2019.01)
- *G06F 16/951* (2019.01)
- *G06F 16/901* (2019.01)
- *G06F 16/2457* (2019.01)
- *G06F 16/957* (2019.01)

(52) U.S. Cl.
CPC ...... *G06F 16/958* (2019.01); *G06F 16/24578* (2019.01); *G06F 16/9024* (2019.01); *G06F 16/951* (2019.01); *G06F 16/957* (2019.01)

(58) Field of Classification Search
None
See application file for complete search history.

(56) References Cited

U.S. PATENT DOCUMENTS

| | | | |
|---|---|---|---|
| 8,843,477 B1 * | 9/2014 | Tirumalareddy | G06F 16/34 707/723 |
| 9,171,320 B2 * | 10/2015 | Unger | G06F 16/958 |
| 9,449,091 B1 * | 9/2016 | Rao | G06Q 30/0271 |

(Continued)

FOREIGN PATENT DOCUMENTS

CN 101826104 B 7/2012

OTHER PUBLICATIONS

H. Nakakubo, S. Nakajima, K. Hatano, J. Miyazaki and S. Uemura, "Web Page Scoring Based on Link Analysis of Web Page Sets," 18th International Workshop on Database and Expert Systems Applications (DEXA 2007), Regensburg, Germany, 2007, pp. 269-273, doi: 10.1109/DEXA.2007.126. (Year: 2007).*

(Continued)

*Primary Examiner* — Richard L Bowen
(74) *Attorney, Agent, or Firm* — Tutunjian & Bitetto, P.C.; Randall Bluestone

(57) ABSTRACT

A computer-implemented method, apparatus, and computer program product for evaluating a page in a website are provided. The method includes obtaining a link structure of the website. The method also includes identifying a page set, the page set being a set of pages linked to a specific page in the website. The method further includes calculating a degree of dispersion of the page set in the link structure. The method also includes evaluating the specific page using the degree of dispersion to generate a score for the specific page.

17 Claims, 5 Drawing Sheets dist ( P36 , P37 ) = 2
dist ( P37 , P38 ) = 4

(56) References Cited

U.S. PATENT DOCUMENTS

| | | |
|---|---|---|
| 2007/0198504 A1 | 8/2007 | Feng et al. |
| 2008/0140606 A1* | 6/2008 | Clark .................... G06F 16/951 |
| 2013/0103678 A1* | 4/2013 | Tretjakov .......... G06F 16/90335 |
| | | 707/723 |
| 2013/0268504 A1* | 10/2013 | Liao ..................... G06F 16/951 |
| | | 707/706 |
| 2015/0220534 A1 | 8/2015 | Constantine et al. |
| 2016/0103913 A1 | 4/2016 | Jacob |

OTHER PUBLICATIONS

Zhu, "Exploiting Link Structure for Web Page Genre Identification", Data Mining and Knowledge Discover, May 2016, pp. 1-26.
Ikawa, "A Web Page Scoring Method for Local Web Search Engines", LNCS, vol. 2973, 2004, pp. 606-617.
Page, "The PageRank Citation Ranking: Bringing Order to the Web", Jan. 29, 1998, pp. 1-17.
List of IBM Patents or Patent Applications Treated as Related dated Jan. 31, 2020, 2 pages.

\* cited by examiner dist ( P6 , P8 ) = 4 dist ( P16 , P17 ) = 2

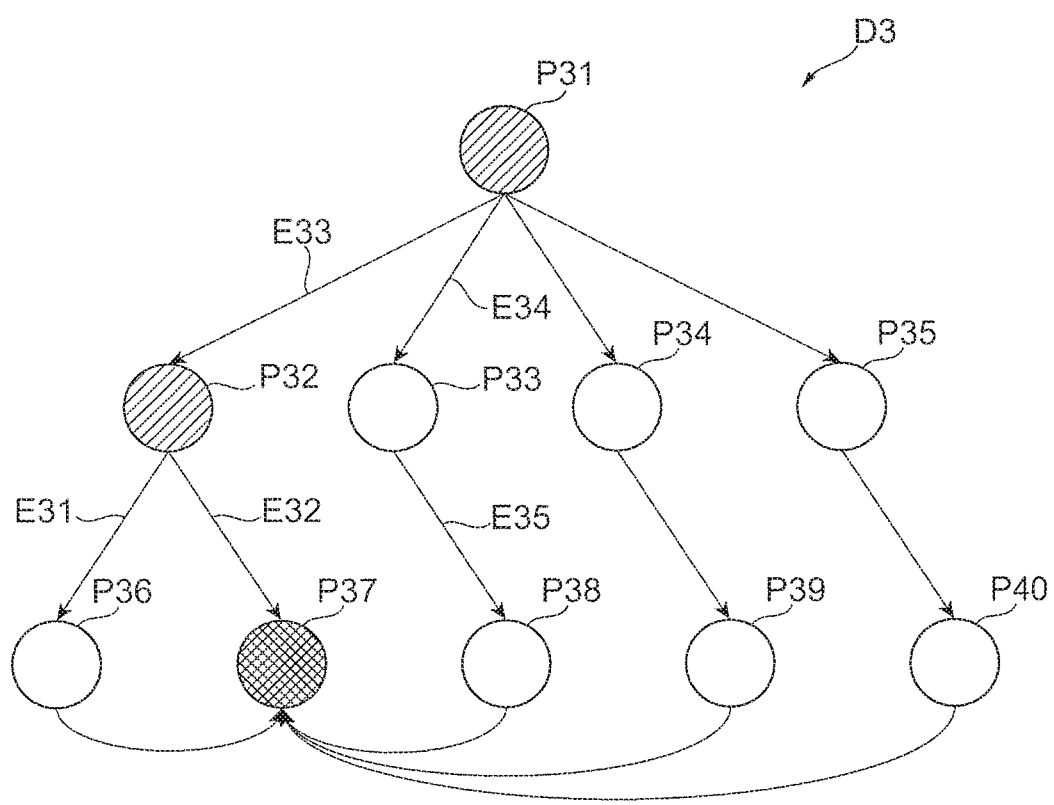

APPARATUS FOR WEBPAGE SCORING

BACKGROUND

The present invention relates to webpage scoring.

The world wide web (WWW) has grown into a large useful database due to the popularization of the Internet. Many people use web search engines to obtain information efficiently. The web search-engines assign a score to a webpage according to its importance. As a result, users can find good pages quickly from a great number of pages on the Internet

SUMMARY

According to an embodiment of the present invention, there is provided a computer-implemented method for evaluating a page in a website. The method includes obtaining a link structure of the website. The method further includes identifying a page set, the page set being a set of pages linked to a specific page in the website. The method further includes calculating a degree of dispersion of the page set in the link structure. The method further includes evaluating the specific page using the degree of dispersion.

According to another embodiment of the present invention, there is provided an evaluating apparatus for evaluating a page in a website. The evaluating apparatus for evaluating a page in a website includes an obtaining unit, an identifying unit, a calculating unit, and evaluating unit. The obtaining unit is configured to obtain a link structure of the website. The identifying unit is configured to identify a page set, the page set being a set of pages linked to a specific page in the website. The calculating unit is configured to calculate a degree of dispersion of the page set in the link structure. The evaluating unit is configured to evaluate the specific page using the degree of dispersion.

According to yet another embodiment of the present invention, there is provided a computer program product for evaluating a page in a website. The computer program product includes a computer readable storage medium having program instructions embodied therewith. The program instructions are executable by a computer to cause the computer to perform the aforementioned method.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 4 depicts a DAG representing a link structure of the third subject web site according to an alternative exemplary embodiment.

DETAILED DESCRIPTION

Hereinafter, exemplary embodiments of the present invention will be described in detail with reference to the attached drawings.

It is to be noted that the present invention is not limited to these exemplary embodiments to be given below and may be implemented with various modifications within the scope of the present invention. In addition, the drawings used herein are for purposes of illustration, and may not show actual dimensions.

Figure 1:
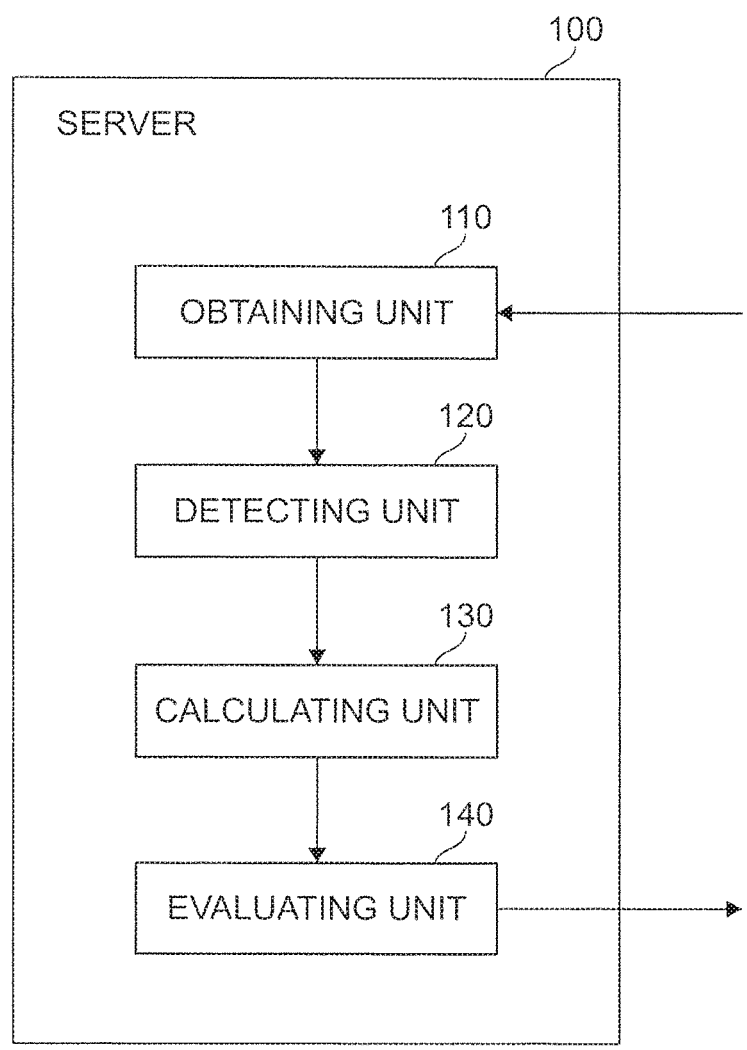
FIG. 1 depicts a block diagram showing a configuration of a server according to an exemplary embodiment of the present invention.

FIG. 1 depicts a block diagram showing a configuration of a server 100 according to an exemplary embodiment of the present invention.

The server 100 shown in FIG. 1 is configured to score a webpage(s) (hereinafter referred to as a page(s)) in a local website (hereinafter referred to as a subject website) for evaluating the respective pages. The server 100 may include an obtaining unit 110 for obtaining a structure of the subject website, a detecting unit 120 for detecting linkage of the pages in the subject website, a calculating unit 130 for calculating a degree of dispersion based on the linkage, and an evaluating unit 140 for evaluating the pages in the subject website based on the degree of dispersion. The degree of dispersion will be explained later. The detecting unit 120 is an example of the claimed identifying unit.

The obtaining unit 110 obtains a link structure of the subject website from directories of the subject website. Here, the pages in the subject website can be organized with the directories as a hierarchical structure, so that the link structure of the subject website may be regarded as a graph. More specifically, the link structure (hereinafter referred to as a structure G) may be shown as a shortest-path tree or a directed acyclic graph (DAG) that is obtained by a breadth-first search from the top page of the subject website using the directories of the subject website.

Note that the graph of the subject website includes nodes and edges (described later). The nodes correspond to respective pages in the subject website. Assuming that the graph is a tree, the root in the tree corresponds to the top page of the subject website, and subtrees form categories of the contents. The edges of the tree correspond to respective links between the pages.

Here, the obtaining unit 110 may obtain the graph by receiving information on the directories of the subject website via a network such as the Internet, a local area network, a wide area network and a wireless network.

The detecting unit 120 detects the linkage of the pages by identifying a page set Pt. The page set Pt is a set, i.e. a group of pages linked to a target page Tp in the subject website. The target page Tp refers to a page to be evaluated. The target page Tp is an example of the claimed specific page.

The detecting unit 120 identifies the page set Pt based on the structure G obtained by the obtaining unit 110. Note that since all pages included in the subject website are typically required to be evaluated, the detecting unit 120 identifies the page set Pt for every page included in the subject website. The page set Pt will be explained below.

The calculating unit 130 calculates a degree of linkage regarding the target page Tp. More specifically, the calculating unit 130 calculates a degree of dispersion of the pages included in the page set Pt. In the present exemplary embodiment, this degree of dispersion in the structure G (hereinafter referred to as a div(Pt)) is calculated based on distance between a pair of subject nodes corresponding to a pair of pages in the page set Pt in the graph. The div(Pt) will be explained later.

The evaluating unit 140 evaluates the respective pages in the subject website based on the div(Pt) calculated by the calculating unit 130. To evaluate the pages, the evaluating unit 140 calculates scores of the respective pages based on the div(Pt). More specifically, the evaluating unit 140 gives a high score to an entry (a page) having a high div(Pt). That is to say, the div(Pt) represents a degree of importance of the target page Tp. As shown in the figure, the evaluating unit 140 outputs a result of the evaluation via the network.

Figure 2:
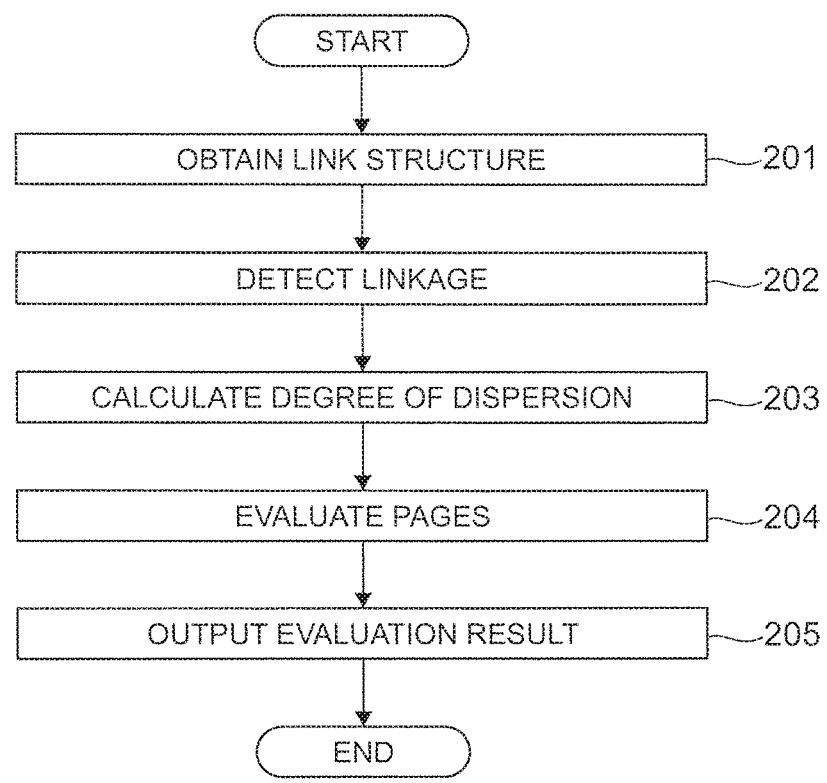
FIG. 2 is a flowchart of an operation of the server according to the exemplary embodiment.

FIG. 2 is a flowchart of an operation of the server 100 according to the exemplary embodiment. Referring to FIGS. 1 and 2, the operation of the server 100 will be explained.

The obtaining unit 110 first obtains the link structure G of the subject website from the directories of the subject website via the network (step 201). The detecting unit 120 then detects the linkage by identifying the page set Pt of the target page Tp in the subject website (step 202). The calculating unit 130 then calculates the div(Pt) (step 203). The evaluating unit 140 then evaluates the respective pages in the subject website based on the div(Pt) (step 204). The evaluating unit 140 then outputs the result of the evaluation via the network (step 205).

Figure 3A:
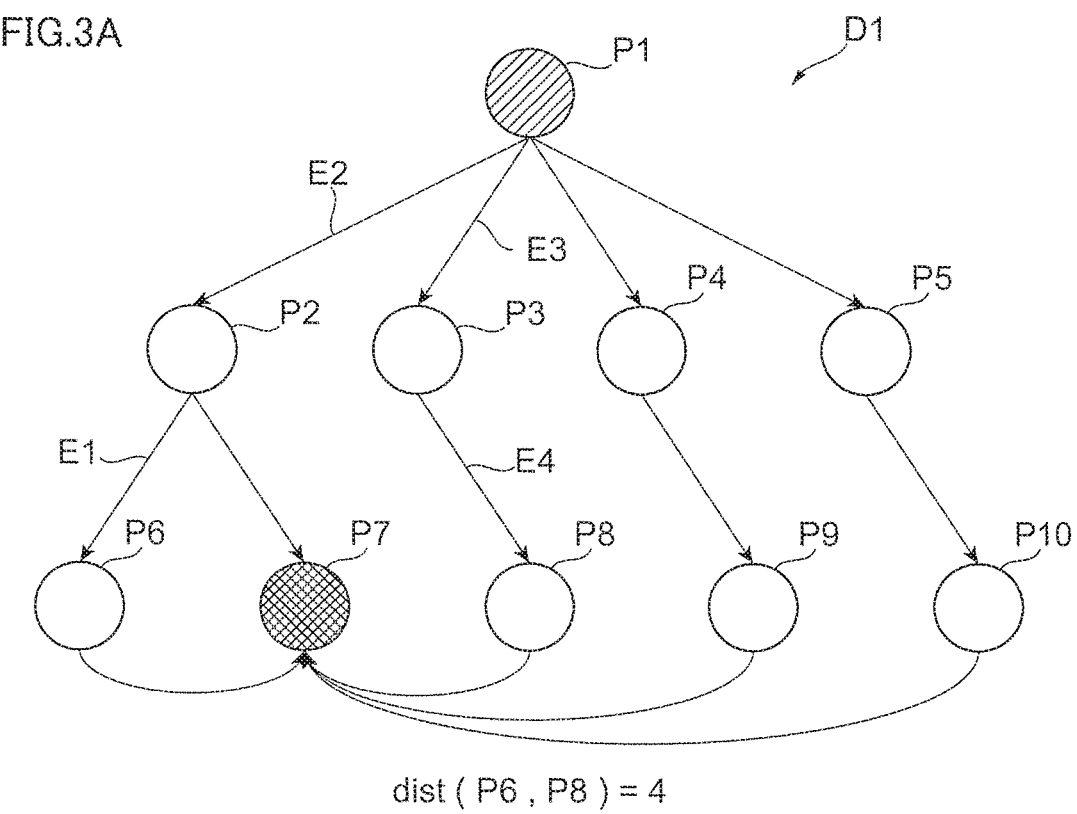
FIG. 3A depicts a DAG representing a link structure of the first subject website according to the exemplary embodiment.
Figure 3B:
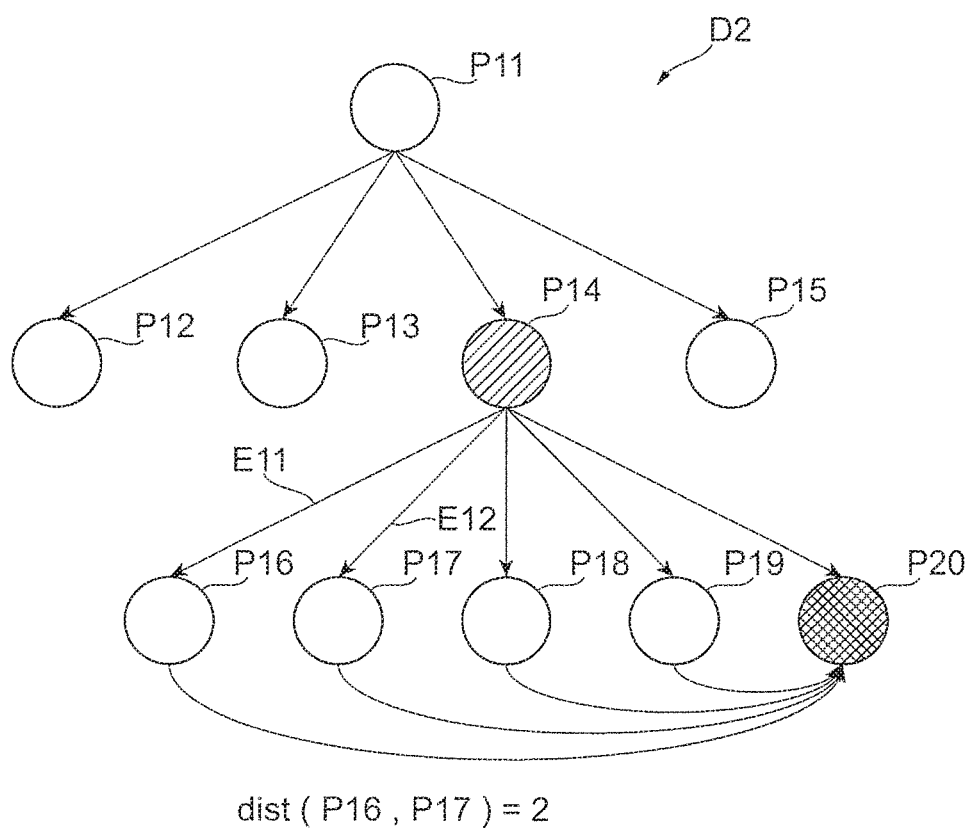
FIG. 3B depicts a DAG representing a link structure of the second subject website according to the exemplary embodiment.

FIG. 3A depicts a DAG D1 representing a link structure of the first subject website according to the exemplary embodiment. FIG. 3B depicts a DAG D2 representing a link structure of the second subject website according to the exemplary embodiment. Referring to FIGS. 1, 3A and 3B, the calculation of the div(Pt) will be explained.

As mentioned above, the div(Pt) is calculated based on the distance between a pair of subject nodes (hereinafter referred to as nodes Pi, Pj) in the page set Pt. In the shown example, the distance of the nodes Pi, Pj (hereinafter referred to as dist(Pi, Pj)) is determined by identifying a lowest common ancestor (hereinafter referred to as lca(Pi, Pj)) of the nodes Pi, Pj. The lca(Pi, Pj) is the lowest, i.e. deepest node that has both of the nodes Pi, Pj as its descendants in the DAG. The dist(Pi, Pj) is calculated as a sum of the distance between the lca(Pi, Pj) and the node Pi, and the distance between the lca(Pi, Pj) and the node Pj. The dist(Pi, Pj) is calculated for all pairs of nodes Pi, Pj The div(Pt) can be expressed as:

$$\mathrm{div}(Pt) = \Sigma_{\text{for all pairs of }(Pi,Pj)} \mathrm{dist}(Pi,Pj)/\text{Number of pairs}$$

where (Pi, Pj) is the node Pi, Pj, and Number of pairs is a number of pairs in the page set Pt.

Here, Number of pairs can be expressed as:

$$\text{Number of pairs} = |Pt|(|Pt|-1)/2$$

where |Pt| is a number of pages included in the page set Pt.

Note that the div(Pt) is an example of the claimed average of distance between a pair of nodes corresponding to pages in the page set via a lowest common ancestor of the pair of nodes.

As shown in FIG. 3A, the DAG D1 includes nodes P1 to P10 and directed edges connecting the nodes P1 to P10. The nodes P1 to P10 correspond to the respective pages of the first subject website. The node P1 corresponds to the top page of the first subject website. Note that the edges correspond to hyperlinks.

Here, assuming that the page corresponding to the node P7 is the target page Pt, an example of the calculation of the div(Pt) will be explained. As shown in FIG. 3A, the node P7 is linked from the nodes P2, P6, P8, P9, and P10, so that the page set Pt will be a group of the pages corresponding to the nodes P2, P6, P8, P9, and P10. Node 7 is not linked from nodes P1, P3, P4, and P5.

Further, taking the nodes P6 and P8 as an example of the nodes Pi, Pj (the pair of subject nodes), lca(P6, P8) will be the node P1. Thus, the dist(P6, P8) is a sum of the distance between the node P1 and the node P6, and the distance between the node P1 and the node P8.

Here, the distance corresponds to a number of edges in a path between the nodes in the graph. Two edges, i.e. edges E1 and E2, exist between the node P1 and the node P6. Further, two edges, i.e. edges E3 and E4, exist between the node P1 and the node P8. Thus, the dist(P6, P8) is four (4=2+2). The div(P7) is gained by calculating the other pairs in the page set Pt, i.e. the group of the nodes P2, P6, P8, P9, and P10 according to the above mentioned formula.

Similarly, the DAG D2 shown in FIG. 3B includes nodes P11 to P20 and directed edges connecting the nodes P11 to P20. The nodes P11 to P20 correspond to the respective pages of the second subject website. Further, the node P11 corresponds to the top page of the second subject website.

Here, another example of the calculation of the div(Pt) will be explained assuming that the page corresponding to the node P20 is the target page Tp. As shown in FIG. 3B, the node P20 is linked from the nodes P14, P16, P17, P18, and P19, so that the page set Pt will be a group of the pages corresponding to the nodes P14, P16, P17, P18, and P19. Node 20 is not linked from nodes P11, P12, P13, and P15.

Further, taking the nodes P16 and P17 as an example of the nodes Pi, Pj, lca(P16, P17) will be the node P14. Thus, the dist(P16, P17) is a sum of the distance between the node P14 and the node P16, and the distance between the node P14 and the node P17.

Here, one edge, i.e. edge E11, exists between the node P14 and the node P16, and one edge, i.e. edge E12, exists between the node P14 and the node P17. Thus, the dist(P16, P17) is two (2=1+1). The dist(P16, P17) is smaller than the above mentioned dist(P6, P8). Similarly, other dist(Pi, Pj) as to the node P20 tends to be smaller than dist(Pi, Pj) as to the node P7. Therefore, the div(P20) will be smaller than the div(P7).

Note that each of the node P7 and the node P20 is linked from five nodes. However, the page corresponding to the node P7 seems to be more important than the page corresponding to the node P20. This is because the page corresponding to the node P7 is linked from various pages compared to the page corresponding to the node P20. In other words, the node P7 is linked from the nodes located far from the node P7 compared to the node 20. In the example, the div(P7) is larger than the div(P20), so that the score of the page corresponding to the node P7 will be higher than the page corresponding to the node P20.

In the present exemplary embodiment, the evaluation using the div(Pt) can reduce the effect of a dense link structure. The dense link structure refers to a link structure having a target node linked from a group of nodes gathered in a specific area. If multiple links are densely gathered in a group of pages showing the same topic, the dense link structure will be formed. For example, the link structure of the node P20 is a dense link structure compared to the link structure of the node P7.

In the example shown in the figures, the score of the page corresponding to the node P20 will be lower than the page corresponding to the node 7. Thus, the evaluation of the page corresponding to the node P20 with the dense link structure becomes low.

In a typical website, webpages have backlinks to the top page or ancestors of the subject page (hereinafter referred to top pages), so that the top pages are typically linked from many pages. That is to say, the top pages may have a dense structure in the typical website.

As a comparative example different from the present exemplary embodiment, a comparative evaluation method will be explained. In this comparative evaluation method, the target page Tp is evaluated by a number of links (incoming links) to the target page Tp. With this comparative evaluation method, the top pages tend to gain a high score. However, the top pages typically show general information, which is often different from information a user searches for. Further, the comparative evaluation method may overlook important pages located in leaves or their neighbors in the tree (the DAG). In contrast, the present exemplary embodiment can give low scores to the top pages, and give high scores to the pages that seem to be important, i.e. popular entries mentioned in the subject website. The scores can be used to enhance and improve search results for a user searching for information found on a page deeper in the link structure of a website.

FIG. 4 depicts a DAG D3 representing a link structure of the third subject website according to an alternative exemplary embodiment. Referring to FIG. 4, an alternative exemplary embodiment of the present invention will be explained.

In the above exemplary embodiment, the distance is determined by a number of edges between the nodes Pi, Pj in the page set Pt. The distance is not limited to this. For example, the distance may be determined by a number of edges between a subject node corresponding to a page in the page set Pt and the node corresponding to the target page Tp. In other words, the target page Tp itself is used to determine the distance in this alternative exemplary embodiment.

As shown in FIG. 4, the DAG D3 includes nodes P31 to P40 and directed edges connecting the nodes P31 to P40. The nodes P31 to P40 correspond to the respective pages of the third subject website. Here, the page corresponding to the node P37 is assumed to be the target page Tp. Further, the page set Pt will be a group of the pages corresponding to the nodes P32, P36, P38, P39, and P40. Nodes P31, P33, P34, and P35 are not in the page set Pt.

Here, taking the node P36 as an example of the subject node, the distance is determined by a number of edges between the node 36 and the node 37. The lca(P36, P37) will be the node P32. The dist(P36, P37) is a sum of the distance between the node P36 and the node P32, and the distance between the node P37 and the node P32. The edge E31 exists between the node P36 and the node P32. The edge E32 exists between the node P37 and the node P32. Thus, the dist(P36, P37) is two (2=1+1).

Similarly, taking the node P38 as another example of the subject node, the distance is determined by a number of edges between the node 37 and the node 38. The lca(P37, P38) will be the node P31. The dist(P37, P38) is a sum of the distance between the node P37 and the node P31, and the distance between the node P38 and the node P31. The edges E32 and E33 exist between the node P37 and the node P31. The edges E34 and E35 exist between the node P38 and the node P31. Thus, the dist(P37, P38) is four (4=2+2).

Here, instead of the lca(Pi, Pj), the distance can be determined with a predetermined node in the graph. For example, a central node may be used to determine the distance. The central node is one node included in the graph, and is in the closest position at an average distance from the respective nodes.

In the above exemplary embodiments, the scoring method utilizes only the link structure regardless of the text included in the respective pages. However, the above mentioned scoring method can utilize both of the link structure and the text. In other words, the above mentioned scoring method can be used with other scoring methods, such as text search. For example, the score gained by the above mentioned scoring method can be used to adjust the result of the text search.

In the above exemplary embodiments, a high score is given to the page having a high div(Pt). As long as the score of the target page Tp is based on the div(Pt), a manner of scoring is not limited to this. For example, a low score can be given to the page having a high div(Pt).

The pages of the local website are not limited to an actual webpage. For example, an object included in the webpage, such as an image, may be treated as a page (a subpage). In this case, a node corresponding to the subpage (the image) is included in the graph.

Figure 5:
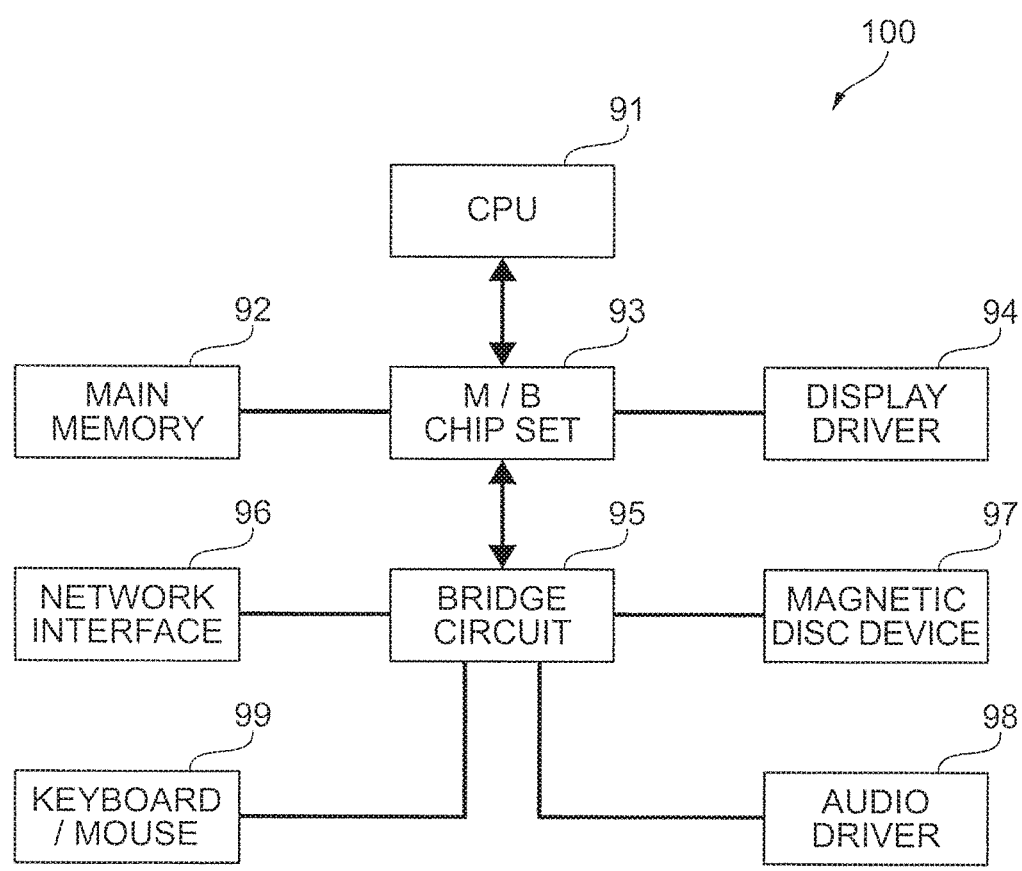
FIG. 5 depicts an example of a hardware configuration of the server according to the exemplary embodiments.

Referring to FIG. 5, there is shown an example of a hardware configuration of the sever 100 in the exemplary embodiments. As shown in the figure, the server 100 may include a central processing unit (CPU) 91, a main memory 92 connected to the CPU 91 via a motherboard (M/B) chip set 93, and a display driver 94 connected to the CPU 91 via the same M/B chip set 93. The display driver 94 can cause a display to show a user a customized search results page using the score obtained from the evaluation unit 140. The customized search results page using the score to improve the results for the user to display the websites with the information searched for instead of the comparative method. A network interface 96, a magnetic disk device 97, an audio driver 98, and a keyboard/mouse 99 are also connected to the M/B chip set 93 via a bridge circuit 95.

In FIG. 5, the various configurational elements are connected via buses. For example, the CPU 91 and the M/B chip set 93, and the M/B chip set 93 and the main memory 92 are connected via CPU buses, respectively. Also, the M/B chip set 93 and the display driver 94 may be connected via an accelerated graphics port (AGP). However, when the display driver 94 includes a PCI express-compatible video card, the M/B chip set 93 and the video card are connected via a PCI express (PCIe) bus. Also, when the network interface 96 is connected to the bridge circuit 95, a PCI Express may be used for the connection, for example. For connecting the magnetic disk device 97 to the bridge circuit 95, a serial AT attachment (ATA), a parallel-transmission ATA, or peripheral components interconnect (PCI) may be used. For connecting the keyboard/mouse 99 to the bridge circuit 95, a universal serial bus (USB) may be used.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for evaluating pages in a website, comprising:
  remotely obtaining a link structure of the website across a computing network in response to a user searching for information found on a specific page in the website;
  calculating a degree of dispersion of a page set linked to the specific page in the website in the link structure, the calculating comprising determining a distance in the link structure between a pair of nodes corresponding to respective pages in the page set;

evaluating the respective pages in the page set and the specific page using the degree of dispersion to generate respective scores indicating a relative importance for the respective pages in the page set and the specific page, the generated scores being determined based on a comparison of path distances in the link structure between the respective pages in the page set and the specific page; and displaying search results to the user based on the generated scores.

2. The computer-implemented method according to claim 1, wherein the specific page of which the degree of dispersion is determined to be higher than a second page is evaluated more highly than the second page.

3. The computer-implemented method according to claim 1, wherein the link structure of the website is a directed acyclic graph (DAG).

4. The computer implemented method according to claim 1, wherein the degree of dispersion is calculated by determining a number of edges in a path between a pair of nodes corresponding to pages in the page set via another node in the link structure.

5. The computer-implemented method according to claim 1, wherein the degree of dispersion is calculated by determining an average of distance between a pair of nodes corresponding to pages in the page set via a lowest common ancestor of the pair of nodes.

6. The computer-implemented method according to claim 1, further comprising determining a distance using a predetermined node in a graph.

7. An evaluating apparatus for evaluating pages in a website, comprising:
a processor operatively coupled to a computer-readable storage medium, the processor being configured for:
remotely obtaining, using an obtaining unit, a link structure of the website across a computing network in response to a user searching for information found on a specific page in the website;
calculating, using a calculating unit, a degree of dispersion of a page set linked to the specific page in the website in the link structure, the calculating comprising determining a distance in the link structure between a pair of nodes corresponding to respective pages in the page set;
evaluating, using the processor, the respective pages in the page set and the specific page using the degree of dispersion to generate respective scores indicating a relative importance for the respective pages in the page set and the specific page, the generated scores being determined based on a comparison of path distances in the link structure between the respective pages in the page set and the specific page; and
displaying, using a display unit, search results based on the generated scores.

8. The evaluating apparatus according to claim 7, wherein the specific page of which the degree of dispersion is determined to be higher than a second page is evaluated more highly than the second page.

9. The evaluating apparatus according to claim 7, wherein the link structure of the website is a directed acyclic graph (DAG).

10. The evaluating apparatus according to claim 7, wherein the degree of dispersion is calculated by determining a number of edges in a path between a pair of nodes corresponding to pages in the page set via another node in the link structure.

11. The evaluating apparatus according to claim 7, wherein the degree of dispersion is calculated by determining an average of distance between a pair of nodes corresponding to pages in the page set via a lowest common ancestor of the pair of nodes.

12. A computer program product for evaluating pages in a website, the computer program product comprising a computer readable storage medium having program instructions embodied therewith, the program instructions executable by a computer to cause the computer to:
remotely obtain a link structure of the website across a computing network in response to a user searching for information found on a specific page in the website;
calculate a degree of dispersion of a page set linked to the specific page in the website in the link structure, the calculating comprising determining a distance in the link structure between a pair of nodes corresponding to respective pages in the page set;
evaluate the respective pages in the page set and the specific page using the degree of dispersion to generate respective scores indicating a relative importance for the respective pages in the page set and the specific page, the generated scores being determined based on a comparison of path distances in the link structure between the respective pages in the page set and the specific page; and
displaying search results to the user based on the generated scores.

13. The computer program product according to claim 12, wherein the specific page of which the degree of dispersion is determined to be higher than a second page is evaluated more highly than the second page.

14. The computer program product according, to claim 12, wherein the link structure of the website is a directed acyclic graph (DAG).

15. The computer program product according to claim 12, wherein the degree of dispersion is calculated by determining a number of edges in a path between a pair of nodes corresponding to pages in the page set via another node in the link structure.

16. The computer program product according to claim 12, wherein the degree of dispersion is calculated by determining an average of distance between a pair of nodes corresponding to pages in the page set via a lowest common ancestor of the pair of nodes.

17. The computer program product according to claim 12, further comprising determining a distance using a predetermined node in a graph.

* * * * *